US008892285B2

(12) United States Patent
Diaz et al.

(10) Patent No.: US 8,892,285 B2
(45) Date of Patent: Nov. 18, 2014

(54) METHOD AND APPARATUS FOR DETERMINING A SOLUTION TO A LINEAR CONSTRAINTS PROBLEM IN A MULTI-MODE POWERTRAIN SYSTEM

(75) Inventors: Michael Glenn Diaz, Ann Arbor, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 178 days.

(21) Appl. No.: 13/569,929

(22) Filed: Aug. 8, 2012

(65) Prior Publication Data

US 2014/0046519 A1 Feb. 13, 2014

(51) Int. Cl.
*G06F 17/11* (2006.01)

(52) U.S. Cl.
USPC .............................................. 701/22; 701/51

(58) Field of Classification Search
USPC ...................................................... 701/22, 51
See application file for complete search history.

(56) References Cited

U.S. PATENT DOCUMENTS

| 7,645,206 | B2 | 1/2010 | Holmes et al. | |
| 2005/0080537 | A1* | 4/2005 | Cawthorne et al. | 701/51 |
| 2010/0179009 | A1 | 7/2010 | Wittkopp et al. | |

OTHER PUBLICATIONS

U.S. Appl. No. 13/570,175, Lado, et al.
U.S. Appl. No. 13/569,929, Diaz, et al.
U.S. Appl. No. 13/568,086, Heap, et al.
U.S. Appl. No. 13/568,070, Heap, et al.
U.S. Appl. No. 13/571,070, Heap, et al.
U.S. Appl. No. 13/568,071, Kim, et al.
U.S. Appl. No. 13/568,083, Heap, et al.

* cited by examiner

*Primary Examiner* — Mary Cheung
*Assistant Examiner* — Yuen Wong

(57) ABSTRACT

A method for operating a powertrain system includes determining an objective function for an object component of interest of the powertrain system. Constraints are determined for a plurality of independent variables and dependent variables. Permutations of the objective function are evaluated with reference to the independent variables and the dependent variables. The objective function is evaluated to determine maximum and minimum values for the objective function for each of the permutations. Overall minimum and maximum values for the objective function are determined based upon the maximum and minimum values for the objective function for each of the permutations. Operation of the powertrain system associated with the object component of interest is controlled based upon the overall minimum and maximum values for the objective function.

19 Claims, 3 Drawing Sheets

# METHOD AND APPARATUS FOR DETERMINING A SOLUTION TO A LINEAR CONSTRAINTS PROBLEM IN A MULTI-MODE POWERTRAIN SYSTEM

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

One known process for identifying extrema, i.e., minima and maxima for an objective function subject to constraints includes employing linear programming, e.g., the Simplex method. The quantity of evaluations required for identifying the extrema is based upon evaluating all combinations of the constraints, which can consume substantial amount of processor resources, and limits an ability to rapidly and repetitively achieve an accurate result that can be used for real-time powertrain control.

SUMMARY

A powertrain system includes an internal combustion engine, a multi-mode transmission having a plurality of torque machines and a driveline. A method for operating the powertrain system includes determining an objective function for an object component of interest of the powertrain system. Constraints are determined for a plurality of independent variables and dependent variables. Permutations of the objective function are evaluated with reference to the independent variables and the dependent variables. The objective function is evaluated to determine maximum and minimum values for the objective function for each of the permutations. Overall minimum and maximum values for the objective function are determined based upon the maximum and minimum values for the objective function for each of the permutations. Operation of the powertrain system associated with the object component of interest is controlled based upon the overall minimum and maximum values for the objective function.

BRIEF DESCRIPTION OF THE DRAWINGS

One or more embodiments will now be described, by way of example, with reference to the accompanying drawings, in which.

DETAILED DESCRIPTION

Figure 1:
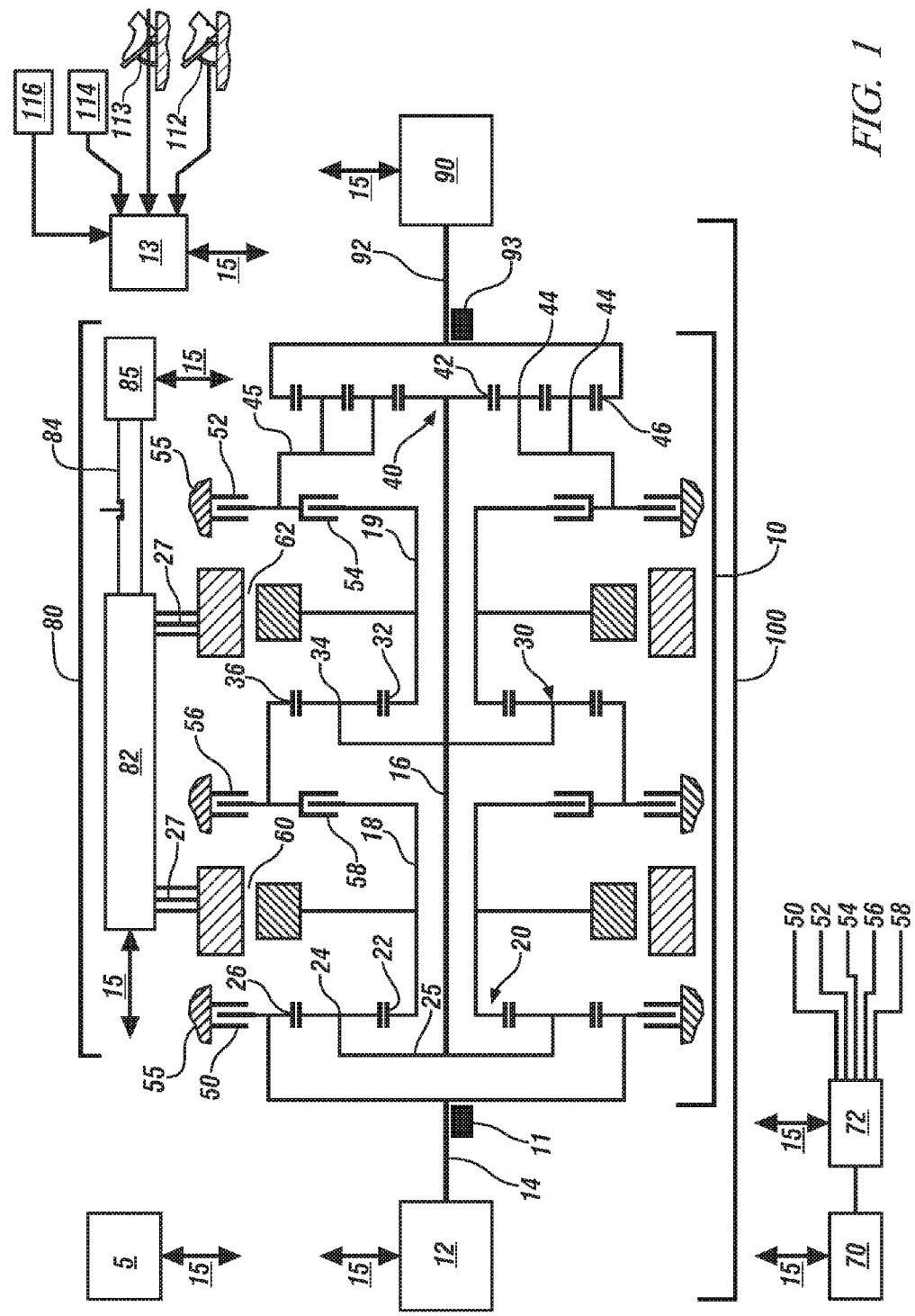
FIG. 1 illustrates a multi-mode powertrain system including an internal combustion engine, transmission, driveline, and a controller, in accordance with the disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque between the engine 12, the torque machines 60, 62, and the driveline 90. As illustrated, the first and second torque machines 60, 62 are electric motor/generators.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., rotational speed and engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board algorithms, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (ESD) 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the battery 85 to AC power for powering respective ones of the first and second torque machines 60 and 62, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the battery 85 to charge and discharge the battery 85.

The controller 5 signally and operatively links to various actuators and sensors in the powertrain system via a communications link 15 to monitor and control operation of the powertrain system, including synthesizing information and inputs, and executing algorithms to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an ON state, an OFF state, and a fuel cutoff (FCO) state. When the engine operates in the OFF state, it is unfueled, not firing, and is not spinning. When the engine operates in the ON state it is fueled, firing, and spinning. When the engine operates in the FCO state, it is spinning but is unfueled and not firing. The engine ON state may further include an all-cylinder state (ALL) wherein all cylinders are fueled and firing, and a cylinder-deactivation state (DEAC) wherein a portion of the cylinders are fueled and firing and the remaining cylinders are unfueled and not firing. The transmission ranges include a plurality of neutral (neutral), fixed gear (Gear #), variable mode (EVT Mode #), electric vehicle (EV#) and transitional (EV Transitional State# and Pseudo-gear #) ranges that are achieved by selectively activating the clutches C1 50, C2 52, C3 54, C4 56, and C5 58. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | ON(ALL/DEAC/FCO)/OFF | | | | | |
| Neutral 2 | ON(ALL/DEAC/FCO)/OFF | | x | | | |
| Neutral 3 | ON(ALL/DEAC/FCO)/OFF | | | | x | |
| PseudoGear 1 | ON(ALL/DEAC/FCO)/OFF | x | | | | |
| PseudoGear 2 | ON(ALL/DEAC/FCO)/OFF | | x | | | |
| Neutral | OFF | | | | | x |
| EVT Mode 1 | ON(ALL/DEAC/FCO)/OFF | x | x | | | |
| EVT Mode 2 | ON(ALL/DEAC/FCO)/OFF | x | | | x | |
| EVT Mode 3 | ON(ALL/DEAC/FCO)/OFF | | | x | x | |
| EVT Mode 4 | ON(ALL/DEAC/FCO)/OFF | | | x | x | |
| EV Transitional State 1 | OFF | x | | | | x |
| EV Transitional State 2 | OFF | | x | | | x |
| Gear 1 | ON(ALL/DEAC/FCO) | x | | | x | x |
| Gear 2 | ON(ALL/DEAC/FCO) | x | x | | x | |
| Gear 3 | ON(ALL/DEAC/FCO) | | | x | x | x |
| EV1 | OFF | x | | | x | x |
| EV2 | OFF | x | | | x | x |
| EV3 | OFF | | | x | x | x |
| EV4 | OFF | | | x | x | x |
| EV Transitional State 3 | OFF | x | x | | | x |
| Neutral | ON(ALL/DEAC/FCO)/OFF | | | | x | x |
| PseudoGear 3 | ON(ALL/DEAC/FCO)/OFF | x | x | | | |
| Neutral | OFF | | | x | | x |
| Neutral | OFF | | | | x | x |

A control scheme is executed to identify extrema, i.e., maximum and minimum torques or accelerations that an object component of interest can carry or produce while being subject to constraints imposed by a powertrain system to control operation, with one such powertrain system described with reference to FIG. 1. The method includes generating an objective component equation, which expresses a relationship for a torque or a rotational speed/acceleration for a component of interest which has linear constraints imposed thereon. The objective component equation is subject to linear constraints that can be converted to equations representing lines.

Figure 2:
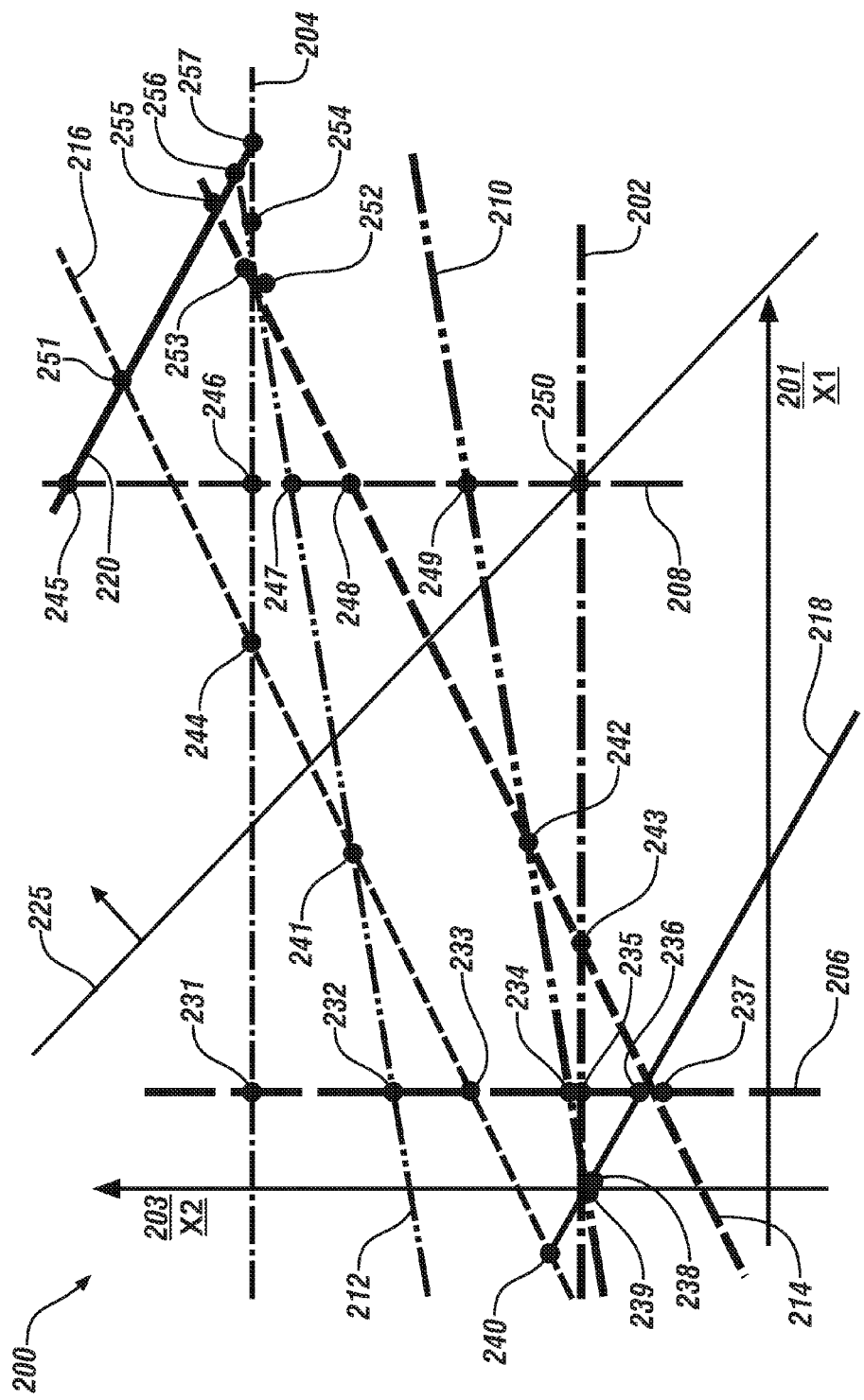
FIG. 2 illustrates a plurality of independent variables and constraints and dependent variables and constraints plotted in relation to first and second independent variables X1 and X2, in accordance with the disclosure.

FIG. 2 includes a graph 200 depicting a plurality of independent variables and constraints and dependent variables and constraints plotted in relation to first and second independent variables X1 and X2, with X1 shown on the horizontal axis 201 and X2 shown on the vertical axis 203. In one embodiment X1 represents rotational speed of the first torque machine 60, i.e., Na, and X2 represents rotational speed of the second torque machine 62, i.e., Nb. Variable X1 has limits of X1-min 202 and X1-max 204 and variable X2 has limits of X2-min 202 and X2-max 204. A third independent variable X3 can be plotted in a third dimension.

An objective function can be determined in relation to the first, second, and third independent variables X1, X2, and X3. The object component of interest Y1 can be represented by an objective component equation having the following form:

$$Y1 = aX1 + bX2 + cX3 + d \quad [1]$$

wherein Y1 represents the object component of interest, e.g., a rotational speed/acceleration of one of the elements of the powertrain system;
a, b, c, and d are known scalar values;
X1, X2, and X3 are independent variable representing speed equations associated with the highest priority and independent variables in the system, e.g., speeds of the first and second torque machines 60, 62 and the engine 10. Independent variables X1, X2, and X3 are subject to the following constraints:
X1_min < X1 ≤ X1_max;
X2_min ≤ X2 ≤ X2_max; and
X3_min ≤ X3 ≤ X3_max.

In addition, there can be linear constraints that are dependent variables. In one embodiment, the relationship described in EQ. 1 is subject to dependent linear variables Y2, Y3, and Y4 as follows:

$$Y2 = a2*X1 + b2*X2 + c2*X3 + D2 \quad [2]$$

$$Y3 = a3*X1 + b3*X2 + c3*X3 + D3 \quad [3]$$

$$Y4 = a4*X1 + b4*X2 + c4*X3 + D4 \quad [4]$$

wherein a2, a3, a4, b2, b3, b4, c2, c3, and c4 terms are system-specific scalar values.
The dependent linear variables Y2, Y3, and Y4 are subject to constraints as follows:

$$Y2\_min \leq Y2 = a2*X1 + b2*X2 + c2*X3 + D2 \leq Y2\_max;$$

$$Y3\_min \leq Y3 = a3*X1 + b3*X2 + c3*X3 + D3 \leq Y3\_max; \text{ and}$$

$$Y4\_min \leq Y4 = a4*X1 + b4*X2 + c4*X3 + D4 \leq Y4\_max.$$

Constraints for the dependent linear variables are shown, including Y2_min 210, Y2_max 212, Y3_min 214, Y3_max 216, Y4_min 218, and Y4_max 220. The aforementioned constraints for the dependent linear variables Y2, Y3, Y4 represent dependent component torque and/or acceleration constraints characterized with linear component equations, each with minimum and maximum limits, and X1, X2, X3 represent three independent actuators characterized by minimum and maximum limits. Thus, a solution to finding minimum and maximum values for the object component of interest Y1 225 can be visualized as intersecting pairs of lines, as depicted in FIG. 2. The minimum and maximum values for the object component of interest Y1 225 are employed to determine limits for operating a system subject to the linear constraints imposed by various elements of the system.

Extrema for the object component of interest Y1 225, i.e., Y1_min and Y1_max, can be found at intersections of the lines representing the constraints for the dependent linear variables Y2, Y3, Y4 and the independent variables X1, X2, and X3 as shown on FIG. 2. The intersections of the lines include points 230 through 257. As such, evaluating and selecting the extrema Y1_min and Y1_max can be computationally demanding, because every evaluation of a new intersection of subset of planes is equivalent to a linear transformation, and yet another linear transformation is necessary in order to check whether the point in question violates any of the other constraints.

Figure 3:
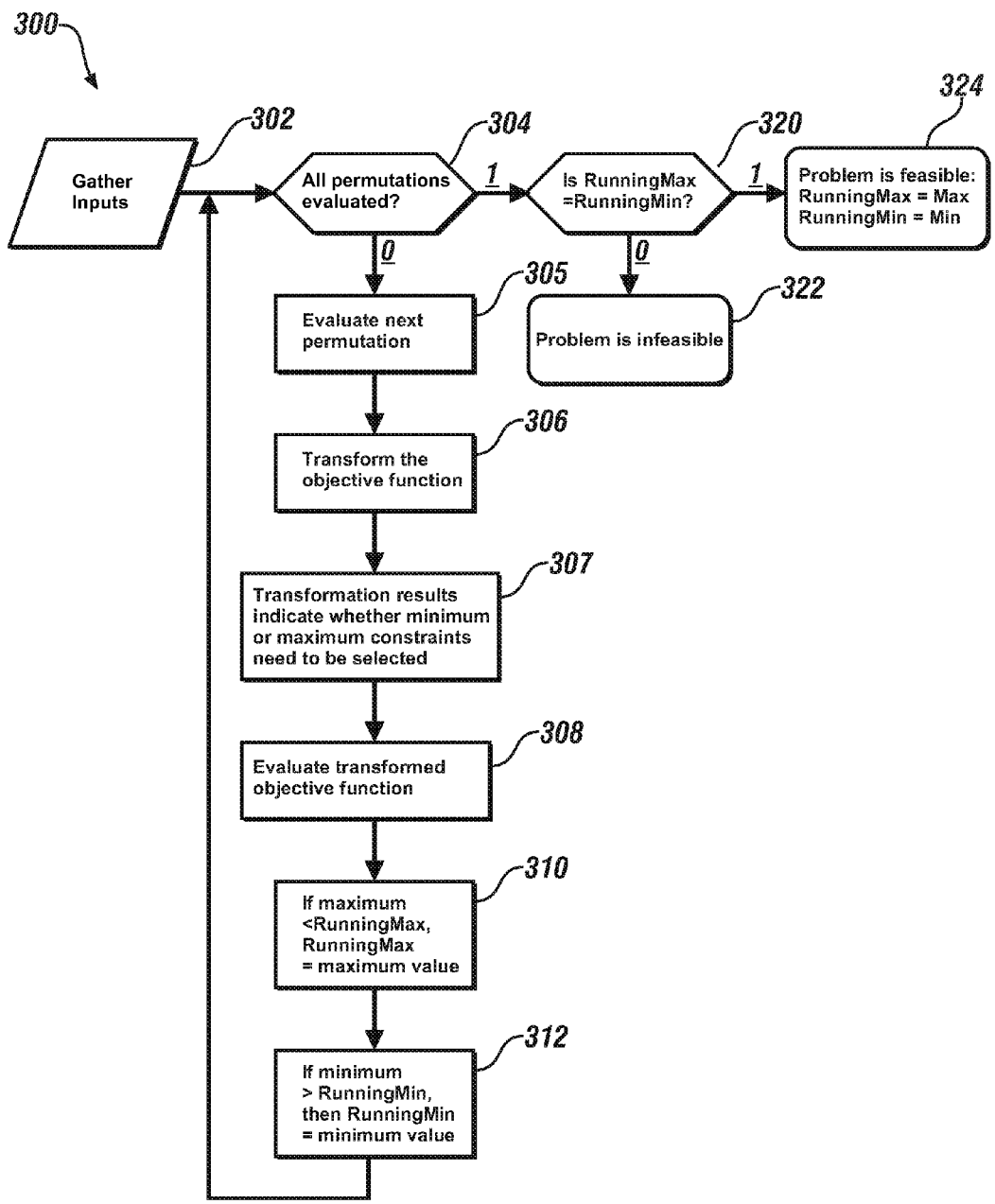
FIG. 3 illustrates a process that is applied to linear constraints including independent variables X1, X2, and X3 and constraints for the dependent linear variables Y2, Y3, Y4 to determine the extrema in relation to the linear constraints, in accordance with the disclosure.

FIG. 3 schematically shows a process 300 that is applied to linear constraints including independent variables X1, X2, and X3 and constraints for the dependent linear variables Y2, Y3, Y4. The process 300 is executed to determine the extrema, i.e., Y1_min and Y1_max, in relation to the linear constraints including independent variables X1, X2, and X3 and constraints for the dependent linear variables Y2, Y3, Y4. Table 2 is provided as a key to FIG. 3, wherein the numerically labeled blocks and the corresponding functions are set forth as follows.

TABLE 2

| BLOCK | BLOCK CONTENTS |
|---|---|
| 302 | Gather Inputs<br>1 objective function in form of component equation<br>3 component equations, each with minimum and maximum limits<br>3 minimum and maximum actuator limits |
| 304 | All permutations evaluated? |
| 305 | Evaluate next permutation |
| 306 | For present permutation:<br>Transform the objective function into the domain of the present permutation's three active constraints, i.e., the three component equations |
| 307 | Transformation results indicate whether minimum or maximum of each of the three active constraints in this permutation need to be selected in order to maximize and minimize the objective |
| 308 | Evaluate the transformed objective function at the maximizing and minimizing values for the present permutation |
| 310 | If maximum value for the present permutation is less than RunningMax, then RunningMax = maximum value for the present permutation |
| 312 | If minimum value for the present permutation is greater than RunningMin, then RunningMin = minimum value for the present permutation |
| 320 | Is RunningMax ≥ RunningMin? |
| 322 | Problem is infeasible |
| 324 | Problem is feasible:<br>RunningMax = Max<br>RunningMin = Min |

The process 300 operates as follows. The inputs including the aforementioned linear constraints of the independent variables X1, X2, and X3 and constraints for the dependent linear variables Y2, Y3, Y4 are defined (302). The system identifies all the permutations of the object component of interest Y1 based upon the independent variables X1, X2, and X3 and the dependent linear variables Y2, Y3, Y4, and then evaluates each permutation of the object component of interest Y1 in an iterative process. This includes determining whether all permutations of the object component of interest Y1 have been evaluated, or alternatively, whether an evaluation of one of the permutations of the object component of interest Y1 has resulted in a solution (304)(0). The permutations are forms of the equation for the object component of interest Y1 as follows.

$$Y1 = aX1 + bX2 + cX3 + d \quad [1]$$

The permutations take into consideration the interrelationships between the independent variables X1, X2, and X3 and the dependent linear variables Y2, Y3, Y4. Thus, exemplary permutations of the object component of interest Y1 can take the following forms, wherein m, n, p, and r are generic constants that are specifically determined for each permutation and thus are likely different for each permutation.

$$Y1 = mX1 + nX2 + pX3 + r \quad [5A]$$

$$Y1 = mX1 + nX2 + pY2 + r \quad [5B]$$

$$Y1 = mX1 + nX2 + pY3 + r \quad [5C]$$

$$Y1 = mX1 + nX2 + pY4 + r \quad [5D]$$

$$Y1 = mX1 + nY2 + pY3 + r \quad [5E]$$

$$Y1 = mX1 + nY2 + pY4 + r \quad [5F]$$

$$Y1 = mX1 + nY3 + pY4 + r \quad [5G]$$

$$Y1 = mX2 + nY2 + pY3 + r \quad [5H]$$

$$Y1 = mX2 + nY2 + pY4 + r \quad [5I]$$

$$Y1 = mX2 + nY3 + pY4 + r \quad [5J]$$

$$Y1 = mX3 + nY2 + pY3 + r \quad [5K]$$

$$Y1 = mX3 + nY2 + pY4 + r \quad [5L]$$

$$Y1 = mX3 + nY3 + pY4 + r \quad [5M]$$

$$Y1 = mY2 + nY3 + pY4 + r \quad [5N]$$

Each of the EQs. 5A-5N represents one of the permutations. The permutations represented by EQs. 5A-5N are sequentially evaluated, including selecting one of the permutations represented by one of the aforementioned EQs. 5A-5N as a present permutation (305). For the present permutation, the objective function is transformed into the domain of the present permutation's three active constraints, i.e., the three component equations representing the selected ones of independent variables X1, X2, and X3 and the dependent linear variables Y2, Y3, Y4 (306). The selected constraints from the permutation are referred to as active constraints.

The transformation results indicate whether minimum or maximum of each of the three active constraints in the present permutation need to be selected in order to maximize and minimize the objective function (307). The transformed objective function is evaluated at the maximizing and minimizing values for the present permutation, i.e., the transformed objective function is evaluated at the minimum and maximum values of the active constraints (308). When a maximum value for the present permutation is less than a present maximum value (RunningMax), then the present maximum value is made equal to the maximum value for the present permutation (310). When a minimum value for the present permutation is greater than a present minimum value (RunningMin), then the present minimum value is made equal to the minimum value for the present permutation (312) and this iteration including evaluation of the present permutation ends.

When all the permutations have been evaluated (304)(1), it is determined whether the present maximum value is less than the present minimum value (320). If so (320)(0), the problem is deemed infeasible, i.e., there is no solution that satisfies all the constraints (322). If not (320)(1), the problem is feasible, and the present maximum value is employed as the maximum value for the objective function Y1 and the present minimum value is employed as the minimum value for the objective function Y1 (324).

The process 300 is executed to accurately and quickly determine maximum and minimum speeds (or torques, or accelerations) that a component can sustain given known physical limits for other components having speeds, torques, or accelerations that are interrelated with those of the objective component. The process 300 is employed to minimize the quantity of permutations while determining correct minimum and maximum values for the objective function. Such operation reduces computational load compared to other algorithms that can be employed to compute maximum and minimum component speeds subject to other maximum and minimum known component speeds where all components can be represented mathematically as functions of the same three independent variables. Exemplary components can include motor speeds, motor torques, clutch speeds, clutch torques, clutch accelerations, engine speeds, engine torques, engine accelerations, output shaft speed, output torque. The method described with reference to FIGS. 2 and 3 may yield a result with 28 function evaluations and 13 linear transformations, whereas a simplex method implementation may require 448 function evaluations and 52 linear transformations to achieve a similar result for the same problem set. Thus resource ultilization is improved.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including a multi-mode transmission configured to transfer torque among an engine, torque machines, and a driveline, the method comprising:
   - determining an objective function for an object component of interest;
   - determining constraints for a plurality of independent variables and dependent variables;
   - evaluating, by a controller, a plurality of permutations of the objective function with reference to the independent variables and the dependent variables;
   - evaluating the objective function to determine maximum and minimum values for the objective function for each of the permutations;
   - determining overall minimum and maximum values for the objective function based upon the maximum and minimum values for the objective function for each of the permutations; and
   - controlling operation of the powertrain system associated with the object component of interest based upon the overall minimum and maximum values for the objective function.

2. The method of claim 1, wherein evaluating the plurality of permutations of the objective function with reference to the independent variables and the dependent variables comprises:

for each permutation of the objective function, transforming the objective function into a domain comprising active constraints of the permutation, said active constraints comprising selected ones of the independent variables and the dependent variables.

3. The method of claim 1, wherein evaluating the objective function to determine maximum and minimum values for the objective function for each of the permutations comprises:
transforming the objective function into a domain comprising active constraints of the permutation; and
evaluating the transformed objective function at the minimum and maximum values of the active constraints for a present permutation.

4. The method of claim 3, further comprising setting a present maximum value equal to the maximum value for the present permutation when the maximum value for the present permutation is less than the present maximum value.

5. The method of claim 3, further comprising setting a present minimum value equal to the minimum value for the present permutation when the minimum value for the present permutation is greater than the present minimum value.

6. The method of claim 1, further comprising determining that a solution to the objective function for the object component of interest is infeasible when the minimum value for the objective function is greater than the maximum value for the objective function based upon the maximum and minimum values for the objective function for all of the permutations.

7. The method of claim 1, wherein determining the objective function for an object component of interest comprises determining an objective function for rotational speed/acceleration of an element of the powertrain system.

8. The method of claim 7, wherein determining the objective function for an object component of interest comprises determining an objective component equation in accordance with the following relationship:

$$Y1 = aX1 + bX2 + cX3 + d$$

wherein Y1 represents an equation for the object component of interest,
X1, X2, and X3 represent equations associated with independent variables, and
a, b, c, and d are known scalar values.

9. The method of claim 8, further X1 and X2 represent the torque machines and X3 represents the engine.

10. The method of claim 1, wherein evaluating the plurality of permutations of the objective function with reference to the independent variables and the dependent variables comprises evaluating the permutations of the objective function subject to the constraints of the independent variables and subject to the constraints for the dependent linear variables.

11. The method of claim 1, wherein determining the constraints for the plurality of independent variables and dependent variables comprises determining constraints for components of the powertrain system having rotational speeds that are interrelated with those of the object component of interest.

12. A method for operating a powertrain system including a multi-mode transmission configured to transfer torque among an engine, torque machines, and a driveline, the method comprising:
evaluating, by a controller, a plurality of permutations of an objective function for an object component of interest with reference to independent variables and dependent variables, each permutation of the objective function based upon interrelationships of speeds, torques, or accelerations between elements represented by the independent variables and elements represented by the dependent variables, said evaluating including, for each permutation of the objective function, transforming the objective function into a domain comprising active constraints of the permutation, and evaluating the transformed objective function at minimum and maximum values of the active constraints for a present permutation to determine maximum and minimum values for the transformed objective function;
determining minimum and maximum values for the objective function based upon the maximum and minimum values for the transformed objective function for each of the permutations; and
controlling operation of the powertrain system associated with the object component of interest based upon the minimum and maximum values for the objective function.

13. The method of claim 12, further comprising setting a present maximum value equal to the maximum value for one of the permutations when the maximum value for the one of the permutations is less than the present maximum value.

14. The method of claim 12, further comprising setting a present minimum value equal to the minimum value for one of the permutations when the minimum value for the one of the permutations is greater than the present minimum value.

15. The method of claim 12, further comprising determining that a solution to the objective function for the object component of interest is infeasible when the minimum value for the objective function is greater than the maximum value for the objective function based upon the maximum and minimum values for the objective function for all of the permutations.

16. The method of claim 12, wherein the objective function for an object component of interest is determined with an objective component equation in accordance with the following relationship:

$$Y1 = aX1 + bX2 + cX3 + d$$

wherein Y1 represents an equation for the object component of interest,
X1, X2, and X3 represent equations associated with independent variables, and
a, b, c, and d are known scalar values.

17. The method of claim 16, wherein X1, X2, and X3 representing equations associated with independent variables comprises X1 and X2 representing the torque machines and X3 representing the engine.

18. The method of claim 12, wherein evaluating the plurality of permutations of the objective function with reference to the independent variables and the dependent variables comprises evaluating the permutations of the objective function subject to the constraints of the independent variables and subject to the constraints for the dependent linear variables.

19. The method of claim 18, wherein the constraints of the independent variables comprise linear constraints and the constraints for the dependent linear variables comprise linear constraints.

* * * * *